United States Patent [19]

Caravito

[11] 4,085,786
[45] Apr. 25, 1978

[54] INTEGRALLY BUILT AND CURED TIRE AND WHEEL ASSEMBLY

[75] Inventor: Vito A. Caravito, Uniontown, Ohio

[73] Assignee: The Goodyear Tire & Rubber Company, Akron, Ohio

[21] Appl. No.: 633,534

[22] Filed: Nov. 19, 1975

[51] Int. Cl.² ............................................. B60C 5/00
[52] U.S. Cl. .................................. 152/158; 152/379.1; 152/405
[58] Field of Search ................. 152/158, 330 RF, 399, 152/400, 401, 411, 384, 354, 379.1, 405, 327, 339, 362 R; 301/11 R, 11 CD, 14, 23, 28; 182/396-398

[56] References Cited

U.S. PATENT DOCUMENTS

| 753,426 | 3/1904 | Palmer | 152/399 |
|---|---|---|---|
| 782,913 | 2/1905 | King | 152/354 |
| 1,189,223 | 7/1916 | Albrecht | 152/330 RF |
| 1,217,665 | 2/1917 | Thropp | 152/384 |
| 1,276,802 | 8/1918 | Overman | 152/396 |
| 1,300,063 | 4/1919 | Walton | 152/158 |
| 1,918,553 | 7/1933 | Musselman | 152/354 |
| 2,010,767 | 8/1935 | Maranville | 156/15 |
| 2,074,284 | 3/1937 | Stevenson | 152/158 |
| 2,850,069 | 9/1958 | Keefe | 152/339 |
| 3,877,504 | 4/1975 | Grawey et al. | 152/411 |

FOREIGN PATENT DOCUMENTS

| 525,898 | 6/1956 | Canada | 152/158 |
|---|---|---|---|
| 1,133,648 | 7/1962 | Germany | 152/379.1 |
| 523,548 | 4/1955 | Italy | 152/158 |

*Primary Examiner*—Robert B. Reeves
*Assistant Examiner*—H. Grant Skaggs
*Attorney, Agent, or Firm*—Frank Pincelli

[57] ABSTRACT

An integral tire and rim assembly in which the tire is built and cured on the rim. The tire is a closed torus crown over-lap type having a pair of annular inextensible beads. The rim is an annular and axially continuous unitary rigid member with flanges that extend radially outwardly beyond the minimum diameter of the inextensible bead cores. A run-flat device is included in the tire cavity.

17 Claims, 7 Drawing Figures

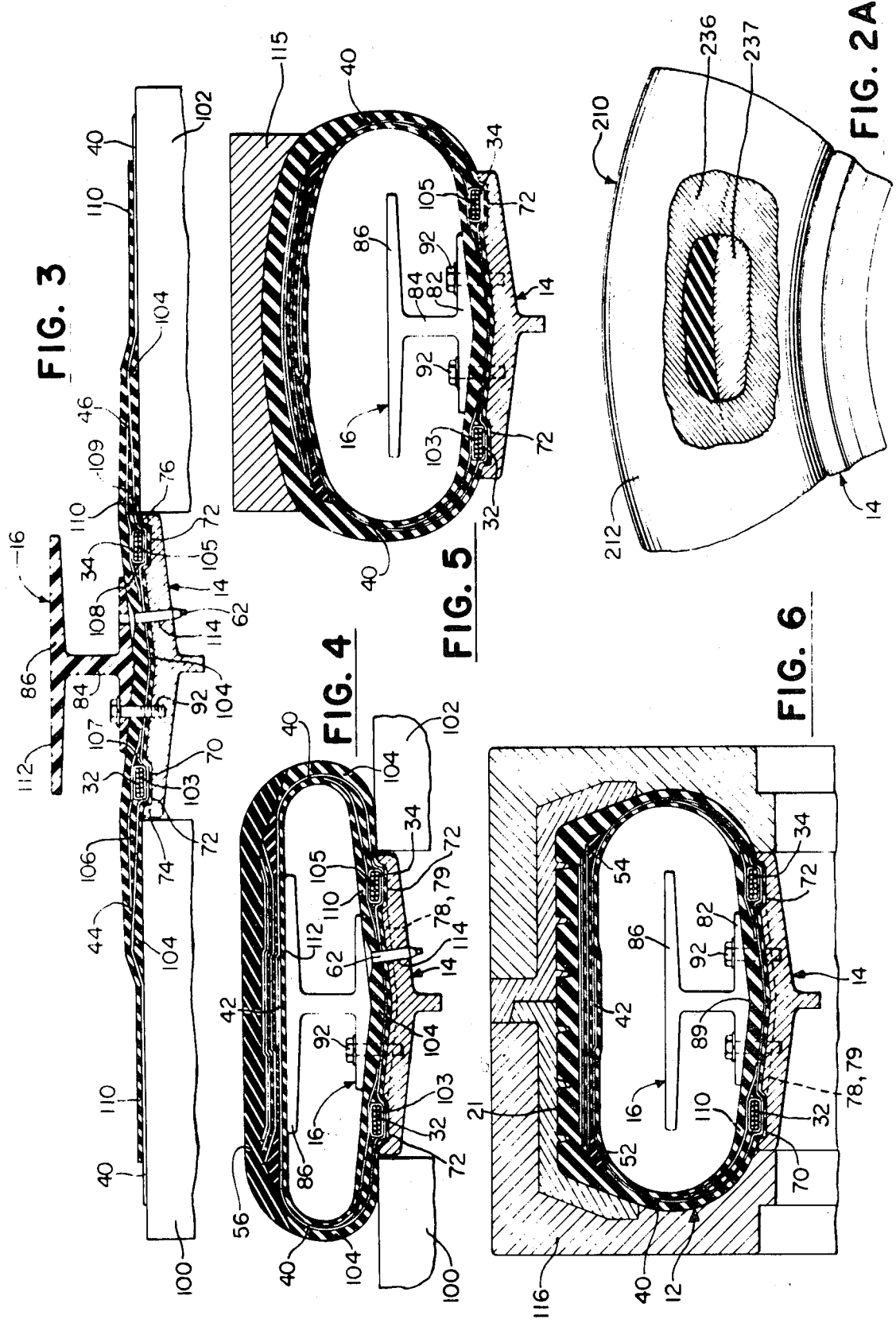

100
INTEGRALLY BUILT AND CURED TIRE AND WHEEL ASSEMBLY

The foregoing abstract is not to be taken as limiting the invention of this application, and in order to understand the full nature and extent of the technical disclosure of this application, reference must be made to the accompanying drawings and the following detailed description.

This invention relates to a pneumatic tire and wheel assembly and more particularly to a closed torus crown over-lap tire built and cured on the rim.

Tires in use today, particularly those on passenger cars, trucks, planes, busses and earth movers, have a pair of inextensible annular bead cores for firmly fixing or securing the tire on the rim. These tires are of the "open torus" or "open belly" type in that they are horseshoe shaped in cross section with the radially inner side open to the atmosphere. The annular bead cores are located in the radially inner edges of the sidewalls and firmly seat the tire on a rim which completes the closure of the air cavity.

The seating or mounting of the bead cores on the rim can be accomplished by one of three methods. First, an integral or continuous single piece rim having a pair of bead seats and a pair of flanges of a larger diameter than the bead core is provided with a drop center portion or wheel well which permits the "button-holing" of the bead portions over the rim flanges. Once the beads have been thus botton-holed over the rim flanges the beads can be moved axially apart to their seated positions on the bead seats of the rim as the tire is inflated.

Another method of getting the tire onto the rim is to provide the rim with one flange that can be detached from the rim. In mounting a tire on a rim of this type the flange is removed from the rest of the rim and the tire slipped axially across the rim base from one side. The flange is then reinstalled on the rim and the tire is inflated. Rims of this type do not have a drop center or a wheel well for button-holing the beads over the rim flange as such is not needed.

The third mounting method is to provide what is generally referred to as a split rim. This type of rim has a circumferential split in the general area of the axial center of the rim so that the rim can be separated into two axially opposed halves. In mounting a tire on a rim of this type the tire is positioned coaxially between the rim halves and the rim halves are then brought axially toward each other and connected. The tire is then inflated. This type of rim also does not have a drop center portion for button-holing the beads over the flange.

In accordance with the present invention a novel pneumatic tire and wheel assembly is provided in which a crown-over-lap tire of a closed torus type is mounted on an integral, rigid, circumferentially and axially continuous one-piece rim. The rim is of the flat base type and has annular flanges disposed axially outwardly of the respective inextensible bead cores with the outside diameter of the annular flanges being greater than the minimum diameter of the inextensible bead cores. Further, a run-flat device is provided within the cavity of the closed torus tire to support the tread portion if the tire is run in a deflated condition.

It is an object, therefore, of the present invention to provide a novel pneumatic tire of a closed torus type on a one-piece rim.

The invention accordingly consists in the features of construction, combination of elements and arrangement of parts which will be exemplified in the construction hereinafter set forth and the scope of the application of which will be indicated in the appended claims.

IN THE DRAWINGS

FIG. 2a is a view similar to FIG. 2 but illustrating an alternate embodiment of the carcass structure of the tire of FIG. 1; and FIG. 3 to 6 are cross sectional views of the tire and rim assembly of FIG. 1 showing the sequential steps of building the tire.

Figure 1:
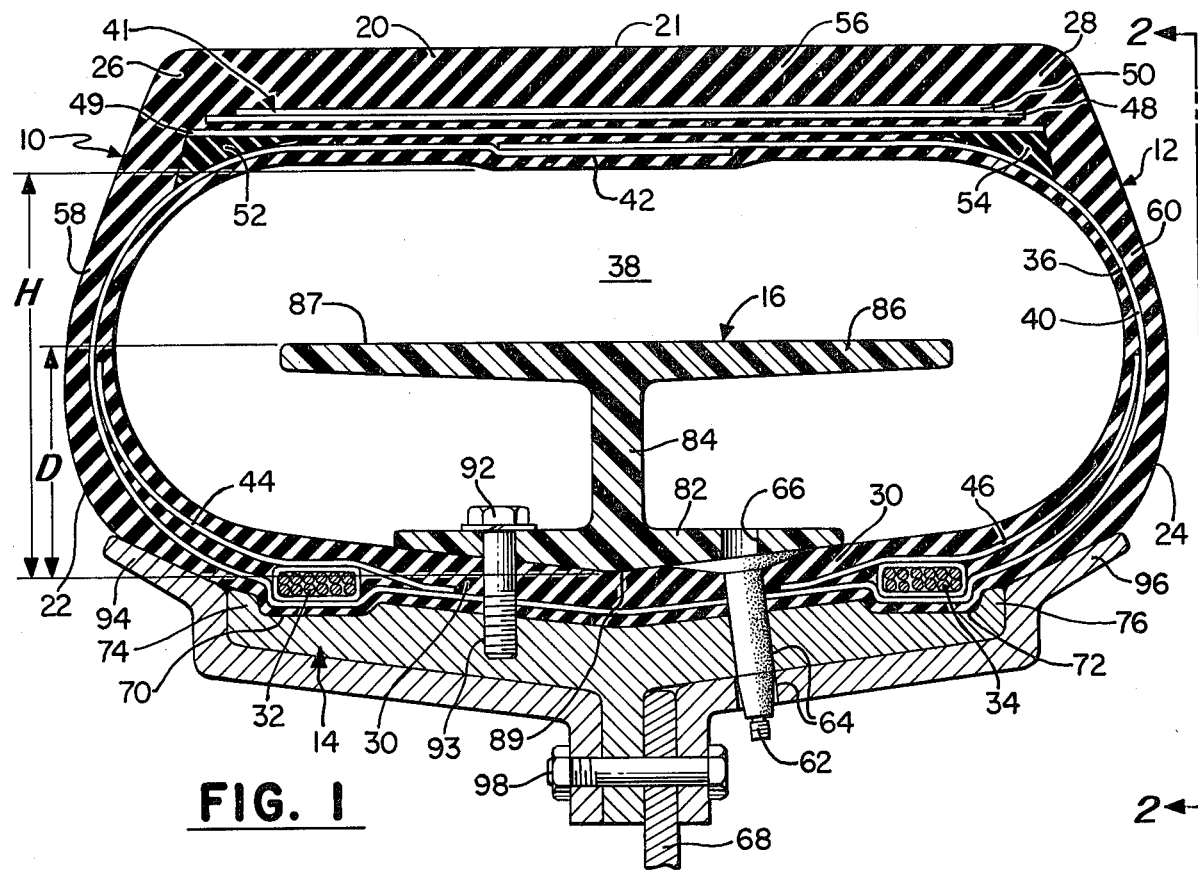
FIG. 1 is a cross sectional view of a tire and rim assembly made in accordance with the present invention.
Figure 2:
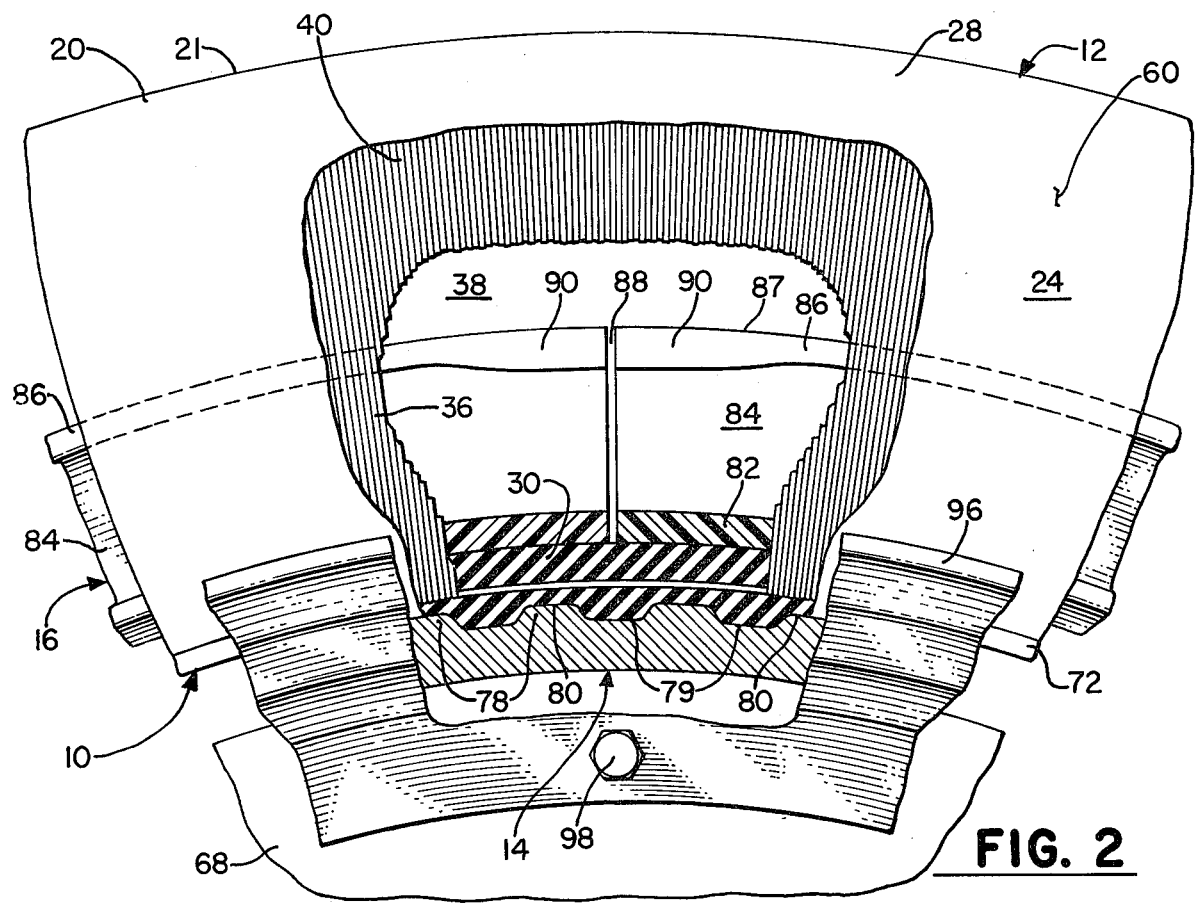
FIG. 2 is a view of the tire of FIG. 1 taken along line 2—2 of FIG. 1 with portions broken away.

With reference to the drawings and in particular FIGS. 1 and 2, there is illustrated a tire and rim assembly generally indicated at 10, which includes a tire 12, a rim 14 and a run-flat device 16. The tire 12 is of a closed torus type inasmuch as the air cavity is provided completely by the pneumatic tire structure itself as opposed to the common type of pneumatic tire in which there is an annular opening on the radially inner side thereof. The radially inner side of the pneumatic chamber of such common type pneumatic tires is provided by the rim.

More particularly, the tire 12 includes a circumferentially extending tread portion 20 forming the radially outer wall of the tire and including the ground contacting surface 21. A pair of sidewalls 22, 24 extend radially inwardly of and from the axially outer edges 26, 28 of the tread portion 20 and terminate at their radially inner ends at an annular radially inner wall 30 of the tire 12. The radially inner wall 30 is in intimate engagement with the rim 14 and includes a pair of annular inextensible bead cores 32, 34 disposed adjacent its axially outer edges.

The tire 12 includes a cord reinforcing structure 36 which extends circumferentially about the tire and completely encircles the air cavity 38. In accordance with the present invention the reinforcing structure includes at least one ply of tire cord fabric which extends around the air cavity 38 as viewed in planes containing the rotational axis of the tire with its ends joined together by means of a lapped portion 42. The lapped portion 42 extends circumferentially about the tire and is disposed centrally, with respect to axial directions, in the tread portion 20 of the tire 12. The particular tire illustrated in FIGS. 1 and 2 is a radial ply tire and includes a single radial wire carcass ply 40. The carcass ply 40 has its cords lying in planes containing the rotational axis of the tire and thus would be considered to be a radial ply carcass. For purposes of this invention a radial ply carcass shall be one in which the cords in the sidewalls 22, 24 of the tire extend at angles of no greater than 15° with respect to planes containing the rotational axis of the tire throughout at least 50 percent of the radial extent of the sidewalls 22, 24.

The annular bead cores 32, 34 made of helically wound wire extend circumferentially about the radial wire carcass ply 40 adjacent the rim 14 to clampingly secure the carcass ply therebetween. While the bead cores 32, 34 illustrated are made of helically wound wire, they could also be made of any suitable high modulus material of any convenient cross sectional configuration such as for example, a helically wound flat band. A pair of annular reinforcing strips of wire cord reinforced fabric 44, 46 are disposed in the lower sidewall portions of the tire and extend from axially inwardly of the respective bead core 32, 34 into the sidewall and may extend to the area of maximum section width. The reinforcing strips 44, 46, together with carcass ply 40 encase the head cores 32, 34.

A belt structure 41 including a pair of wire cord reinforced plies 48, 50 and a layer of nylon fabric 49, extend circumferentially about the carcass ply 40 in the tread portion 20 and terminates in axial directions short of the axially outer extremities of the ground contacting surface 21. The plies 48, 50 have their cords crossed with respect to each other and extend at an appropriate angle with respect to the circumferential center line of the tire. Such an angle would normally range from about 15° to about 30°, with the optimum being in the order of about 18° to 22°. The nylon fabric ply 49 is made of continuous nylon cords extending substantially in axial directions.

The tire 20 may also include annular wedge strips of rubber 52, 54 disposed between the axially outer edges of the belt structure 41 and the carcass ply 40. Suitable rubber tread layer 56 and rubber sidewall layers 58, 60 are provided.

While only one carcass ply 40 has been illustrated, it will be appreciated that more than one such ply can be provided and that the cord reinforcing material in the ply can be of any suitable material such as, by way of example, nylon, rayon, polyester, fiberglass, wire, or any other suitable material, including ones not yet discovered. Also, while only one stabilizer strip 44, 46 has been provided in each lower sidewall has been shown any number of lower sidewall reinforcing members of any suitable material such as, by way of example only, hard rubber or cord or fiber reinforced material of any suitable structure or configuration.

Similarly, while three plies, 48, 49 and 50 have been illustrated in the belt structure, it will be appreciated that any suitable belt structure can be utilized such as single or multiple plies of helically wound cord extending substantially in a circumferential direction or multiple biased belt plies. The materials of the belt material again can be any suitable material for use in tires, including those not yet discovered. It may also be desirable to provide additional reinforcing members such as shredded wire, fibers or continuous cord layers over or under the belt plies either axially continuous across the belt structure or merely adjacent the axially outer edges of the belt structure.

An inflating valve 62 is integrally cured to the inner wall 30 of the tire 12 and extends through a hole 64 in the rim 14. A hole 66 is provided in the run-flat device 16 to permit passage of air from the inflation valve 62 to the air cavity 38.

The rim 14 is an annular unitary rigid member which may be bolted to a wheel 68 as illustrated or may be an integral part of the wheel. In any event, however, the rim 14 is circumferentially and axially continuous and provides a complete continuous rigid seating surface for the tire 12 that is free of any separation or parting lines. Further, the rim 14 is of the flat base type since it is free of any annular depression therein such as the well in a drop center rim which is sufficient to permit the buttonholing of the beads over the rim flange.

A pair of annular grooves 70, 72 are provided in the radially outer surface of the rim 14 adjacent the axially outer edges thereof for receiving the inextensible annular bead cores 32, 34. Thus, a pair of flanges 74, 76 are provided in positions axially outwardly of the respective bead cores 32, 34 to provide a firm seating of the tire 12 on the rim 14.

Also, and particularly with reference to FIG. 2, the rim 14 has a plurality of axially extending circumferentially spaced-apart ridges 78 on the radially outer surface of the rim 14, forming a plurality of transverse grooves 79. A plurality of recesses 80 are provided on the radially inner surface of the radially inner wall 30 of the tire 12 for receiving the axially extending ridges 78. The radially inner surface of the radially inner wall of the tire, therefore, neatly conforms to the radially outer surface of the rim 14. Advantageously, the tire 12 is adhered to the rim 14 by a suitable adhesive which is conveniently of a type that gains its full strength through vulcanization. Although it may not always be necessary to provide both the combination of the adhesive between the tire 12 and rim 14 and the annular groove and recess arrangement, the combination provides a firm connection between the tire and the rim, to transmit the torque.

The run-flat device 16 includes an annular rigid clamping means 82 extending circumferentially about the radially inner wall 30 of the tire 12. An annular support member 84 extends circumferentially about and radially outward of the clamping member 82 and supports a generally cylindrical member 86 for supporting the tread when the tire is run in an uninflated condition. The run-flat device is divided into two or more members by means of radial splits, one of which is illustrated at 88, to permit convenient mounting about the tire and rim assembly. In order to provide uniform deflection of the run-flat device as the split 88 passes through the footprint when the tire is in an uninflated condition, the ends of the cylindrical member 86 are thickened as illustrated at 90 adjacent the split 88.

Means 92 for connecting the clamping portion 82 of the run-flat device 16 to the rim 14 are provided. In the particular embodiment illustrated, the means 92 are a series of bolts which extend through the clamping member 82, the radially inner wall 30 of the tire 12 and are threadably received in holes 93 in the rim 14. The bolts or connecting means 92 thus provide means to draw the clamping member toward the rim to clamp the radially inner tire wall 30 between the clamping means 82 and the rim 14.

The radially outer surface 87 of the cylindrical member 86 is located radially outwardly of the radially inner surface 89 of the air cavity 38 a distance D equal to between 20 percent and 80 percent of the radial height H of the air cavity 38. The distance D is preferably about 40 percent to 60 percent of the radial height H.

The run-flat device 16 should be made of any suitable material for providing resilient load carrying capacity when the assembly is run with the tire deflated. Such a suitable material is fiberglass reinforced epoxy. The configuration of the run-flat device may also be altered to provide such resilient load carrying capacity. Additionally a resilient cushion such as rubber can be provided on the outer surface 87 of the cylindrical member 86. It may also be desirable to provide a suitable lubricant which may be packaged in a manner such that it is released when the tire is run in a deflated condition.

If additional lateral stability or cornering response is desired, it is possible to provide a pair of annular flange extensions 94, 96 adjacent the integral rim flanges 74, 76. These flange extensions 94, 96 could be fastened to the rim 14 or wheel 68 in any suitable fashion as by bolts 98. The flange extension 94, 96 should closely conform to the inflated contour of the tire 12 and preferably would not be adhered thereto.

With reference to FIG. 3, in manufacturing the tire in accordance with the present invention, a pair of cylindrical building forms 100, 102 are situated on axially opposite sides of the rim 14 and coaxially with respect thereto. Means not shown are provided for rotating the building forms 100, 102 in unison with the rim 14. In building the tire, a layer of rubber 104 which is to constitute the outer rubber covering 58, 60 of the sidewalls and the radially inner rubber covering for the radially inner wall 30 is wrapped circumferentially about the rim 14 and building forms 100, 102. The rubber is then tightly stitched down or pressed against the rim 14 to fill the transverse grooves 79 between the transverse ridges 78. The carcass ply 40 of tire cord fabric is then wrapped circumferentially about the rubber cover 104. Inextensible cords such as wires 103, 105 are then helically wound about the carcass ply 40 in the area of the annular grooves 70, 72 in the rim 14 to form the bead cores 32, 34 respectively. They are wound quite tightly about the carcass ply 40 and thus draw the carcass plies radially inwardly into the annular grooves 70, 72 and provide for a minimum diameter of the bead cores with respect to the rotational axis of the drum which is less than the outside diameter of the rim flanges 74, 76. Annular tapered strips of rubber 106, 107, 108 and 109 are wrapped about the carcass ply 40 adjacent the annular bead cores 32, 34 to provide smooth transition between the bead cores 32, 34 and the carcass ply 40 to receive the reinforcing fabric plies 44, 46.

An innerliner 110 of air impervious material is then wrapped circumferentially about the rim 14 and building forms 100, 102. A hole 114 is provided in the radially inner wall 30 to communicate with the valve hole 64 in the rim 14. Valve 62 including a semi-cured rubber flange 63 is then inserted through the hole and adhered to the uncured carcass structure.

The run-flat device 16 including the rigid clamping portion 82 is then installed circumferentially about the central portion of the rim 14. Bolts 92 having generally pointed ends are inserted through the carcass structure and threadably received in the rim 14. The clamping portion 82 is then drawn down tightly against the radially inner walls of the tire to clamp the inner walls 30 to the rim 14. A suitable releasing medium is then applied to the radially outer surface 112 of the cylindrical tread support portion 86 to prevent the tire from adhering to the surface 112. The releasing medium can be a film, coating or any other means, one example being a layer of zinc stearate.

If a run-flat means is not provided, it becomes desirable to provide a smooth radially outer surface on the clamping means against which the tire components can be pressed to stitch them together. This can be done, for example, by providing recesses in the clamping means 82 for the heads of the bolts 92 and wrapping tape about the clamping means 82 after it is bolted to the rim 14.

With reference to FIG. 4, the axially outer ends of the carcass structure are folded axially inwardly toward each other such that the ends overlap in the area of the circumferential centerline of the rim and tire assembly. The circumferentially extending lap portion 42 is then stitched tightly together by pressing against the radially outer surface of the run-flat device 16. The belt structure 41 and shoulder strips 52, 54 are then provided circumferentially about the carcass structure and stitched tightly thereto. In the embodiment illustrated in FIG. 4, the plies in the belt structure 41 are wrapped about the carcass. Tread rubber is then wrapped circumferentially about the belt structure 41.

The belt structure 41 and tread rubber may also be prebuilt on a separate form and transferred by means of an O-ring 115, illustrated in FIG. 5, to a coaxial centered position around the tire and rim assembly. The carcass is then inflated into tight engagement with the belt structure.

Referring now to FIG. 6, the entire tire and rim assembly is removed from the building apparatus and placed in a curing apparatus including a mold 116. The tire is inflated to the desired torus configuration and cured under heat and pressure. Subsequent to curing the tire and rim assembly is removed from the mold and ready for installation on the vehicle.

With reference to FIG. 2a there is illustrated a bias ply tire 212 constructed in accordance with the present invention. The tire and rim assembly 210 and the method of making it are similar to the assembly with the radial ply tire 12. With the bias ply tire, however, the carcass plies 236, 237 extend from one bead portion through the sidewalls and tread area at alternating relatively smaller angles with respect to the circumferential centerline of the tire 12. The cord angle of the bias plies at the circumferential centerline is normally between 25° and 45° and there may or may not be belt or breaker plies included beneath the tread portion. Again, any suitable number of reinforcing plies of any suitable material can be provided.

While certain representative embodiments and details have been shown for the purpose of illustrating the invention, it will be apparent to those skilled in this art that various changes and modifications may be made therein without departing from the spirit or scope of the invention.

What is claimed is:

1. An integral pneumatic tire and rim assembly in which said tire is of a closed torus contruction and has at least one carcass ply that is joined in the tread area to provide a circumferential splice, a circumferentially extending tread portion, said splice disposed centrally in said tread portion of said tire, a radial inner wall engaging the rim and a pair of sidewalls connecting the respective axial outer edges of the tread and radial inner wall; and said rim is an annular unitary rigid member, said assembly being further characterized by an annular unitary rigid means disposed in the cavity of a tire adjacent said radial inner wall, said annular unitary rigid means having a clamping member, an annular support member which extends circumferentially about said tire and radially outward of said clamping member and a generally cylindrical support member for supporting the tread when the tire is run in an uninflated condition and means extending between and connecting said clamping member and said rim to clamp said tire on said rim.

2. An assembly as claimed in claim 1 wherein said means extending between and connecting said annular rigid means to said rim includes means to draw said annular rigid means against said tire and said rim.

3. An assembly as claimed in claim 2 wherein said annular rigid means includes an annular surface spaced between 20 and 80 percent of the distance from the radial inner wall of the tire to the tread surface of the tire to provide support for said tread portion if said tire is run in a deflated condition.

4. An assembly as claimed in claim 1 wherein said tire further includes an annular inextensible bead ring disposed adjacent each axially outer edge of said radial inner wall and said rim is a flat base rim with a flange of lager diameter with respect to the rotational axis of the assembly than the minimum diameter of said bead rings disposed axial outwardly of each bead ring.

5. An assembly as claimed in claim 4 wherein said tire is a bias ply tire.

6. An assembly as claimed in claim 4 wherein said tire is a radial ply tire.

7. An assembly as claimed in claim 4 wherein said tire is adhered to said rim.

8. A tire as claimed in claim 4 wherein the radial inner surface of said radial inner wall includes a plurality of axially extending recesses and the radial outer surface of said rim includes axially extending ridges which conform to the recesses in said radial inner wall.

9. An assembly as claimed in claim 8 wherein said tire is adhered to said rim.

10. An integral tire and rim assembly in which said tire is of a closed torus construction having carcass plies that are joined in the tread area to provide a circumferential splice, a circumferentially extending tread portion, said splice disposed centrally within said tread portion of said tire, a radial inner wall and a pair of sidewalls connecting the axial outer edges of said tread portion and radial inner wall and having a pair of inextensible bead cores disposed adjacent the axial outer edges of the inside wall of said radially inner wall; and said rim is an annular unitary rigid member of a flate base construction having flanges disposed at its axial outer edges and axially outwardly of the pair of bead cores, said flanges having a larger diameter than the minimum diameter of said inextensible bead cores, a pair of annular removable flange extensions are disposed axially outward of said pair of flanges and are of a configuration which conforms to the radially inner sidewalls of the tire to provide lateral rigidity to the structure.

11. An assembly as claimed in claim 10 wherein said tire is a bias ply tire.

12. An assembly as claimed in claim 10 wherein said tire is a radial ply tire.

13. An assembly as claimed in claim 10 wherein the radially outer surface of said rim includes axially extending grooves and the radially inner surface of the radial inner wall of the tire has axially extending ridges which mate with the axially extending grooves in the rim.

14. An assembly as claimed in claim 10 wherein said tire is adhered to said rim.

15. An assembly as claimed in claim 14 wherein the radially outer surface of said rim includes transverse grooves and the radially inner surface of the radial inner wall of the tire has transverse ridges which mate with the transverse grooves in the rim.

16. An assembly as claimed in claim 10 further including an annular surface disposed within the cavity of said tire and located 20 percent to 80 percent of the distance from the radially innermost point in the tire cavity to the radial outermost point in the tire cavity to support said tread surface when said tire is run in an inflated condition.

17. An assembly as claimed in claim 16 wherein said annular surface is located 40 percent to 60 percent of the distance from the radially innermost point in the tire cavity to the radial outermost point in the tire cavity to support said tread surface when said tire is run in an inflated condition.

* * * * *